US007409166B2

United States Patent
Corbel et al.

(10) Patent No.: US 7,409,166 B2
(45) Date of Patent: Aug. 5, 2008

(54) DEVICE AND A METHOD FOR PROCESSING A DIGITAL SIGNAL IN A BIT-TO-BIT POLARIZATION-INTERLEAVED FORMAT OF AN OPTICAL TRANSMISSION SYSTEM

(75) Inventors: Erwan Corbel, Bourg-la-Reine (FR); Gabriel Charlet, Villiers-le-Bacle (FR)

(73) Assignee: Alcatel, Paris (FR)

( * ) Notice: Subject to any disclaimer, the term of this patent is extended or adjusted under 35 U.S.C. 154(b) by 369 days.

(21) Appl. No.: 11/192,355

(22) Filed: Jul. 29, 2005

(65) Prior Publication Data

US 2006/0045538 A1 Mar. 2, 2006

(30) Foreign Application Priority Data

Aug. 27, 2004 (EP) .................................. 04292104

(51) Int. Cl.
*H04B 10/06* (2006.01)
(52) U.S. Cl. .................... 398/205; 398/65; 398/152
(58) Field of Classification Search ............... 398/65, 398/152, 184, 205
See application file for complete search history.

(56) References Cited

U.S. PATENT DOCUMENTS

| 3,752,992 | A | * | 8/1973 | Fluhr | ........................ 398/65 |
| 5,140,453 | A | * | 8/1992 | Tsushima et al. | ........... 398/205 |
| 5,822,100 | A | | 10/1998 | Robinson et al. | |
| 6,671,437 | B2 | * | 12/2003 | Margalit | ...................... 385/40 |
| 2002/0118422 | A1 | | 8/2002 | Cao | |
| 2003/0090768 | A1 | * | 5/2003 | Liu et al. | ..................... 359/183 |

OTHER PUBLICATIONS

Napasab V et al: "Polarization Recombining: A New Automatic Polarization Control Scheme For Heterodyne or Homodyne Optical Receivers," Journal of Optical Communications, Fachverlag Schiele & Schon, Berlin, DE, vol. 9, No. 9, Sep. 1, 1988, pp. 102-107, XP000000862.

* cited by examiner

*Primary Examiner*—Christina Y. Leung
(74) *Attorney, Agent, or Firm*—Sughrue Mion, PLLC

(57) ABSTRACT

A device for processing a digital signal of an optical transmission system is described. The device comprises: a polarization beam splitter for receiving the signal, a phase shifter for shifting the phase of the signal at the orthogonal output of the polarization beam splitter, and means for combining the signal at the parallel output of the polarization beam splitter and the shifted signal.

10 Claims, 1 Drawing Sheet

DEVICE AND A METHOD FOR PROCESSING A DIGITAL SIGNAL IN A BIT-TO-BIT POLARIZATION-INTERLEAVED FORMAT OF AN OPTICAL TRANSMISSION SYSTEM

TECHNICAL FIELD

The invention relates to a device and a method for processing a digital signal of an optical transmission system. The invention is based on a priority application EP 04 292 104.9 which is hereby incorporated by reference.

BACKGROUND OF THE INVENTION

It is known to use a bit-to-bit polarization-interleaved signal in an optical transmission system. It is also known that this format is very sensitive to polarization-dependent losses (PDL) because two adjacent pulses are not subject to the same attenuation during their transmission.

SUMMARY OF THE INVENTION

It is an object of the invention to provide a device and a method for processing e.g. a bit-to-bit polarization-interleaved signal without the disadvantage of polarization-dependent losses.

The invention solves this object with a polarization beam splitter for receiving the signal, a phase shifter for shifting the phase of the signal at the orthogonal output of the polarization beam splitter, and means for combining the signal at the parallel output of the polarization beam splitter and the shifted signal.

The invention provides a converter for an alternated-polarized signal into a single-polarized signal. The output of the converter therefore provides a single-polarized data stream that may be further processed in order to compensate the polarization-dependent losses.

The advantage of the invention is the fact that it is more effective to compensate polarization-dependent losses of a single-polarized data stream. Therefore, the invention decreases the efforts to overcome these polarization-dependent losses e.g. in connection with a bit-to-bit polarization-interleaved signal.

In an embodiment of the invention, a delay filter is provided. With this delay filter, the polarization-dependent losses of the single-polarized data stream can be compensated.

The invention is particularly advantageous in connection with a digital signal according to the differential phased shift keying (DPSK) format.

BRIEF DESCRIPTION OF THE DRAWINGS

Further features, applications and advantages of the invention will become apparent from the following description of exemplary embodiments of the invention which are shown in the drawings. There, all described and shown feature themselves or in any combination represent the subject matter of the invention, independently of their wording in the description or their representation in the drawings and independently of their combination in the claims or the dependencies of the claims.

DETAILED DESCRIPTION OF PREFERRED EMBODIMENTS

Figure 1:
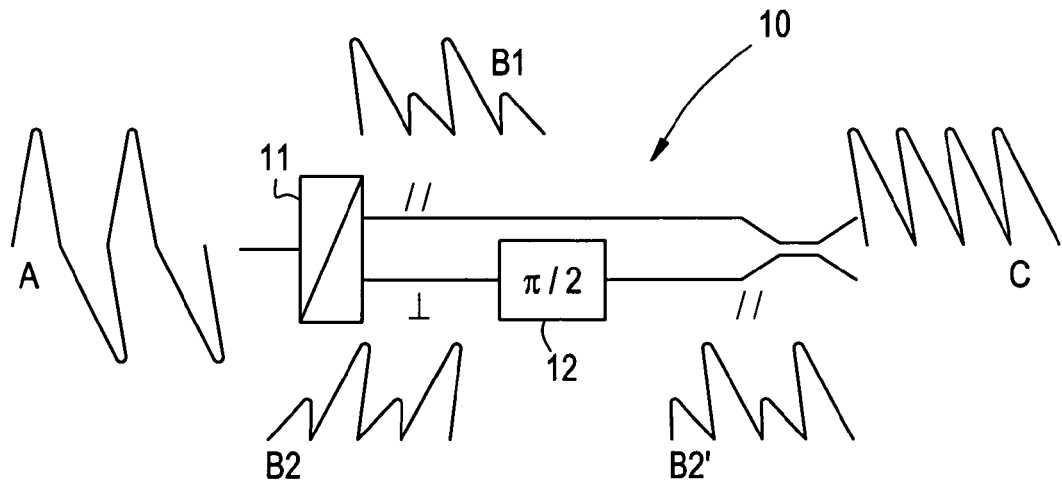
FIG. 1 shows a schematic circuit diagram of a first device for processing a digital signal of an optical transmission system according to the invention.

In FIG. 1, a first device 10 is provided that comprises a passive optical polarization beam splitter 11 followed by a passive optical phase shifter 12 at its orthogonal output.

The phase shifter 12 shifts the phase of the signal at the orthogonal output of the polarization beam splitter 11 by n/2. The signal at the parallel output of the polarization beam splitter 11 remains unchanged. The output of the phase shifter 12 and the parallel output of the polarization beam splitter 11 are then combined.

The first device 11 may be incorporated in a receiver of an optical transmission system.

A digital signal A in a bit-to-bit polarization-interleaved format is received at the input of the polarization beam splitter 11. The signal A comprises subsequent pulses wherein the orientation of a pulse indicates the polarization state of this pulse. The subsequent pulses of the signal A, therefore, have alternating polarizations.

After passing the polarization beam splitter 11, a signal B1 is present at the parallel output of the polarization beam splitter 11, and a signal B2 is present at the orthogonal output of the polarization beam splitter 11. Again, the orientation of a pulse of the signals B1, B2 indicates the polarization state of this pulse.

All pulses of the signal B1 have the same polarization. The same is valid for the pulses of the signal B2. However, the polarization of the pulses of the signal B1 is different from the polarization of the pulses of the signal B2.

After passing the phase shifter 12, the signal B2 has changed into the signal B2'. All pulses of the signal B2' still have the same polarization. However, compared to the signal B2, the polarization of the pulses of the signal B2' has changed. This polarization of the signal B2' is now similar to the polarization of the signal B1.

As already described, the signal B1 at the parallel output of the polarization beam splitter 11 and the signal B2' at the output of the phase shifter 12 are then combined. The result is a signal C that has the same polarization as the signals B1 and B2'.

As a result, the first device 10 converts the alternated-polarized signal A into the single-polarized signal C. The first device 10, therefore, provides an alternated-to-single-polarization conversion of the signal A. The resulting signal C may then be processed as a single-polarized data stream.

Figure 2:
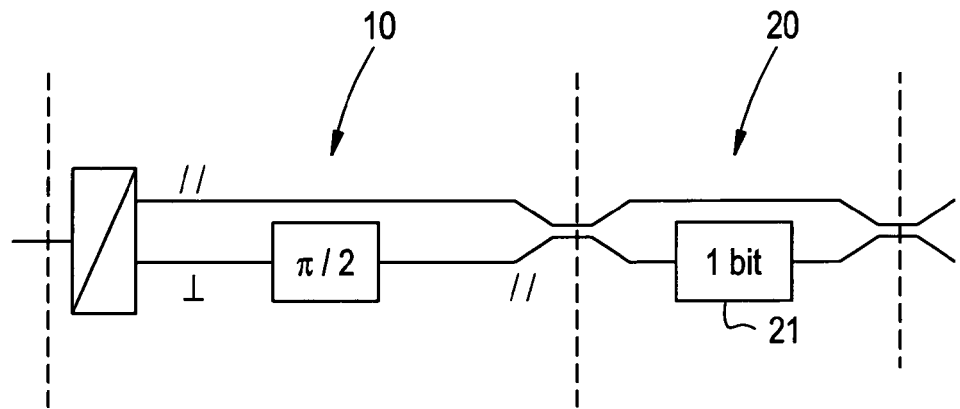
FIG. 2 shows a schematic circuit diagram of the first device of FIG. 1 and a second device.

In FIG. 2, the first device 10 is shown being followed by a second device 20. The second device 20 comprises a passive optical delay filter 21, in particular a Mach Zehnder filter. The delay filter 21 comprises a first path that does not change the received signal. A second path of the delay filter 21 delays its received signal by one bit. The two paths are then combined into the output of the delay filter 21.

Figure 3:
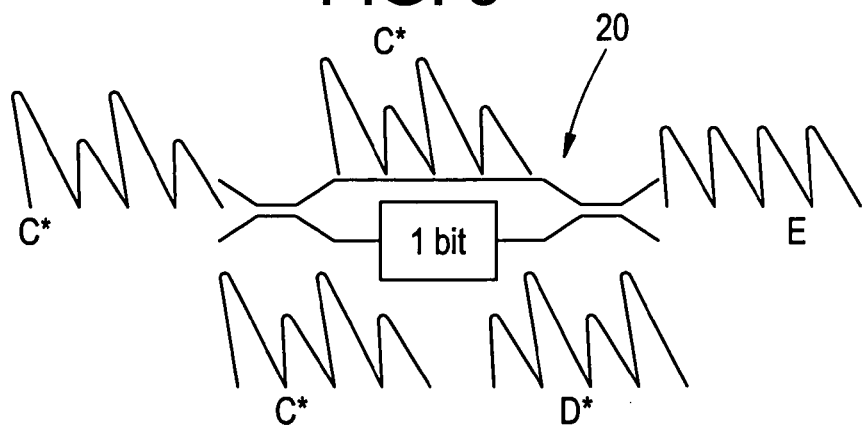
FIG. 3 shows a schematic circuit diagram of the second device of FIG. 2.

In connection with FIG. 3, the second device 20 is explained in more details. It is assumed that the second device 20 receives the signal C from the first device 10. Furthermore, it is assumed that the subsequent pulses of this signal C are affected by polarization-dependent losses (PDL). Therefore, the signal at the input of the second device is characterized as a signal C*. The polarization-dependent losses are indicated in this signal C* by the different heights of the subsequent pulses.

In the mentioned second path of the delay filter 21 of the second device 20, the signal C* is delayed by one bit resulting in a signal D*. Then, the signal C* of the first path and the signal D* are combined into a signal E at the output of the second device 20.

A comparison shows that the signal D* still incorporates the described polarization-dependent losses. However, compared to the signal C*, the heights of the subsequent pulses of the signal D* are reversed.

This reversed sequence of the pulses of the signal D* has the consequence that the combination of this signal D* with the signal C* leads to a compensation of the polarization-dependent losses. Therefore, the signal E at the output of the second device 20 is not affected anymore by polarization-dependent losses. This is indicated in FIG. 3 by the same heights of the subsequent pulses of the signal E.

The described first and second devices 10, 20 may be used in connection with the demodulation of a digital signal according to the differential phased shift keying (DPSK) format. Then, devices and algorithms known from single-polarized applications may be used for receiving and processing this such signal. Furthermore, the required devices, in particular the Mach Zehnder filter, may be carried out in the known PLC technology (PLC=planar lightwave circuit).

The invention claimed is:

1. A device for processing a digital signal of an optical transmission system, the device comprising:
   a polarization beam splitter which receives the digital signal,
   a phase shifter which shifts the phase of a first portion of the digital signal at the orthogonal output of the polarization beam splitter,
   means for combining a second portion of the digital signal at the parallel output of the polarization beam splitter and the shifted first portion of the digital signal into a single combined signal, and
   a delay filter which receives the combined signal,
   wherein the delay filter comprises a first path which does not change a first portion of the combined signal, a second path which delays a second portion of the combined signal, and means for combining the first portion of the combined signal with the delayed second portion of the combined signal.

2. The device of claim 1, wherein the phase shifter shifts the phase of the first portion of the digital signal by $\pi/2$.

3. The device of claim 1, wherein the second path of the delay filter delays the second portion of the combined signal by one bit.

4. The device of claim 1, wherein the digital signal is in a bit-to-bit polarization-interleaved format.

5. The device of claim 1, wherein the device is used within a receiver of the optical transmission system.

6. The device of claim 1, wherein the device converts an alternated-polarized signal into a single-polarized signal of an optical transmission system.

7. The device of claim 1, wherein the delay filter comprises an optical delay filter.

8. A method for processing a digital signal of an optical transmission system, the method comprising:
   receiving the digital signal by a polarization beam splitter,
   shifting the phase of a first portion of the digital signal at the orthogonal output of the polarization beam splitter,
   combining a second portion of the digital signal at the parallel output of the polarization beam splitter and the shifted first portion of the digital signal into a single combined signal;
   transmitting a first portion of the combined signal;
   delaying a second portion of the combined signal; and
   combining the first portion of the combined signal with the delayed second portion of the combined signal.

9. The method of claim 8, wherein the digital signal is in a differential phased shift keying format.

10. A device for processing a digital signal of an optical transmission system, the device comprising:
   a polarization beam splitter which receives the digital signal,
   a phase shifter which shifts the phase of a first portion of the digital signal at the orthogonal output of the polarization beam splitter,
   a first combiner which combines a second portion of the digital signal at the parallel output of the polarization beam splitter and the shifted first portion of the digital signal into a single combined signal, and
   a delay filter which receives the combined signal,
   wherein the delay filter comprises a first path which does not change a first portion of the combined signal, a second path which delays a second portion of the combined signal, and a second combiner which combines the first portion of the combined signal with the delayed second portion of the combined signal.

* * * * *